United States Patent Office 3,441,511
Patented Apr. 29, 1969

3,441,511
ALKALI METAL HYDROXIDE-CONTAINING
AGGLOMERATES
Joseph V. Otrhalek, Dearborn, and Paul E. Luoma, Grosse Ile, Mich., assignors to Wyandotte Chemicals Corporation, Wyandotte, Mich., a corporation of Michigan
No Drawing. Filed Dec. 20, 1965, Ser. No. 515,249
Int. Cl. C01d 1/44; C11d 11/00
U.S. Cl. 252—135          9 Claims

ABSTRACT OF THE DISCLOSURE

The preparation of agglomerates by subjecting a mass of finely divided solid particles to a tumbling action by a continuously moving surface, adding a liquid containing alkali metal hydroxide to said tumbling particles, and continuing said tumbling to form said agglomerates.

This invention relates to the manufacture of agglomerates containing an alkali metal hydroxide in substantially homogeneous nodular form.

Alkali metal hydroxides such as sodium hydroxide, potassium hydroxide, and lithium hydroxide is solid form have utility and there is a substantial demand for such materials. These alkali metal hydroxides are commercially obtainable in the form of flakes and in drums. Where drums are employed, molten alkali metal hydroxide is poured into the drums and the drums are cooled.

Alkali metal hydroxide in the form of agglomerates in substantially homogeneous nodular form has many advantages over these prior art forms since it is relatively dust free and yet flows readily from containers in which it may be stored.

Useful products are also obtained by mixing alkali metal hydroxides with other solids. For example, mixtures of caustic soda with cleansing agents such as sodium silicates, soda ash, sodium sulfate, trisodium phosphate, sodium pyrophosphate, wetting agents, etc., have been prepared for use as detergents.

Prior art mixtures of alkali metal hydroxides and other solids such as detergent materials are generally mixtures of anhydrous flake caustic soda or other alkali metal hydroxide and the detergent material or materials and thus contain discrete particles of each ingredient. Often, the added detergent materials are solids of finer particle size than the caustic soda so that some separation occurs in mixtures of the two, causing a ratio of alkali metal hydroxide to the other materials to vary somewhat resulting in harm to fabrics, materials, etc., when the percentage of caustic is too high and incomplete removal of dirt when the percentage is too low for detergent applications.

Accordingly, a process has been developed in the prior art wherein flakes of substantially anhydrous sodium hydroxide are steamed with saturated steam to moisten the surfaces thereof. A finely divided solid of the desired material such as alkali metal phosphates, sodium silicates, etc., having a particle size smaller than that of the sodium hydroxide flakes, preferably about 60 mesh or finer, is then admixed with the sodium hydroxide adhering to the moist surfaces. The mixture is tumbled or otherwise agitated to mix the two ingredients uniformly. However, this process has certain inherent disadvantages due to the necessity of using anhydrous caustic flake which must be steamed and which is a much more expensive product than a conventional 74% commercial caustic liquor.

Accordingly, it is a purpose of this invention to provide a novel process for producing agglomerates in substantially homogeneous nodular form of alkali metal hydroxide alone or in admixture with other solid materials.

In accordance with the instant invention, agglomerates containing alkali metal hydroxide are produced by subjecting a mass of finely divided solid particles of at least one material to be incorporated in the agglomerates to a tumbling action by a continuously moving surface such as the inner surface of a rotating cylinder or drum or a rotating pan or disc tilted at an angle. A liquid containing alkali metal hydroxide is then added to the tumbling particles in an amount sufficient to produce agglomerates containing at least 10 percent by weight alkali metal hydroxide and continuing the tumbling to form the agglomerates.

The agglometrated particles produced by the method of this invention generally range from about 1/16 inch diameter to 1½ inches diameter. While the method of this invention may be employed for producing agglomerates of pure, or substantially pure, alkali metal hydroxide, a variety of solid substances, particularly cleaning agents or detergent substances can be admixed with the sodium hydroxide, according to this invention, to produce agglomerates of sodium hydroxide and the additional material.

Where pure, or substantially pure, alkali metal hydroxide agglomerates are to be prepared, a seed bed of finely divided particles of the alkali metal hydroxide is provided in a rotating cylinder or inclined pan and alkali metal hydroxide, preferably in the form of an aqueous solution, such as an aqueous 74% sodium hydroxide solution, is then poured or sprayed onto the particles. The process could also be performed by pouring molten alkali metal hydroxide onto the tumbling seed bed. Where the process of this invention is employed to prepare agglomerates of alkali metal hydroxide mixed with other solids, the seed bed may be made up of particles of one or more of the other solids or a mixture of the other solids with particles of the alkali metal hydroxide. The additional solids may also be added by mixing or dissolving in the alkali metal hydroxide solution.

It is important in performing this process to maintain the temperature of the bed of material below about 175° F. since at higher temperatures the bed tends to become mealy and does not mix properly. It is preferred to maintain the temperature about 120° F. Such temperature generally may be maintained by controlling the temperature of the liquid being added to the bed. The particles in the seed bed tend to form a heat sink whereby the temperature of the liquid is reduced on contacting and mixing with the seed particles. Accordingly, the liquid is heated before pouring by conventional means to a temperature sufficiently high to maintain the desired bed temperature after contact and mixing with the material in the bed. Temperature control may also be obtained by jacketting the rotating drum or inclined pan and circulating a fluid such as water of the proper temperature through the jacket.

The particles may be cooled in the tumbling apparatus or merely stored after discharge from the apparatus and permitted to cool during storage. However, where desirable, the particles from the tumbling apparatus may be cooled, preferably with dehumidified air in a conventional cooling apparatus such as a rotating cylinder or drum wherein cooling air is passed over the material passing through the drum. Other types of cooling apparatus include a fluidized bed column and a vibrating spiral elevator.

Detergent materials, which may be incorporated with the alkali metal hydroxide in the agglomerates, include alkaline, acid, or neutral builder salts, wetting agents and auxiliary additives such as absorbent siliceous compounds including calcium silicate, fuller's earth, finely divided silicia, diatomaceous earth and mixtures thereof, anti-soil redeposition agents, for example, carboxymethylcellulose etc. Builder salts which can be agglomerated with the alkali metal hydroxide in accordance with the present invention include, for example, alkali metal silicates, phosphates including the molecular dehydrated phosphates, carbonates and sulfates. Typical of these builder salts are sodium orthosilicate, sodium metasilicate, sodium carbonate, trisodium phosphate, sodium tripolyphosphate, tetrasodium pyrophosphate, sodium hexametaphosphate, sodium tetraborate and sodium sulfate. Conventional wetting agents such as alkyl sulfates, alkyl sulfonates, alkylaryl sulfonates, sulfonated esters of fatty acids, sulfonated amides of fatty acids, and the like may be included in the agglomerates. Other wettng agents which may be employed include nonionic surface active agents such as the nonionic surface active agents prepared by the sequential addition of propylene oxide and then ethylene oxide is propylene glycol, e.g., those commercially available under the trademark Pluronic, and the solid or liquid organic silicones, polyethylene glycol ethers of long-chain alcohols, tertiary amine or alkylol amine salts of long-chain alkyl acid sulfate esters, alkyl sulfonic esters, etc. For a product containing detergent material as described above, a product containing about 10 to 99 percent by weight alkali metal hydroxide and about 90 to 1 percent by weight of one or more of the above detergent materials is preferred.

One advantage of the instant process is that it produces homogeneous agglomerates which have superior and more uniform solubility in water along with improved handling and storage properties. A particular advantage of the process of this invention is that a solution of the alkali metal hydroxide such as, for example, the commercial 74% caustic liquor is employed in producing the product whereas the prior art generally requires the use of anhydrous caustic which is considerably more expensive than caustic liquor. Another advantage of the process of this invention is that some of the additives or ingredients are encapsulated in the agglomerates whereby unwanted reactions which occur in conventional mechanical mixtures are eliminated or substantially reduced. For example, agglomerates with an encapsulated surface active agent can be blended with chlorinated trisodium phosphate to prevent excessive loss of chlorine during storage resulting from the intimate contact of the surface active agent with the chlorine-bearing compound.

The following examples further illustrate the invention:

EXAMPLE I

This example illustrates a batch process embodying the principles of this invention. In accordance with this example a seed bed of the materials indicated in Table I below under the heading "Seed Material" and in the amounts indicated in the table are introduced into a 6½-inch diameter, 3¼-inch deep inclined pan similar to that illustrated in FIGURE 5, p. 92 of Chemical Engineering for Feb. 5, 1962. The axis of the shaft on which the pan is mounted is tilted at an angle of 75° to the horizontal. The pan is rotated at 26 r.p.m. by means of a conventional electric motor and drive means driving the shaft. A 74% by weight aqueous solution of sodium hydroxide containing 1 percent by weight sodium carboxymethylcellulose is preheated to 200° F. and poured onto the starting seed material during rotation. Heat is removed by the normal circulation of atmospheric air at 74° F. and 41% relative humidity which is in contact with the material in the pan. The length of time for the agglomeration run and the calculated composition of the product are indicated in Table I below.

Agglomerates of the size indicated in Table I below are produced which are sufficiently hard and free flowing to permit handling without sticking.

TABLE I

|  | Run 1 | Run 2 | Run 3 |
|---|---|---|---|
| Operating Variables: |  |  |  |
|   Length of Run, min | 120 | 15 | 35 |
|   Solution, Total Weight, g | 374 | 71 | 122 |
|   Seed Material | (1) | (2) | (3) |
|     Size, mesh | −40,+100 | −40,+100 | −40,+100 |
|     Weight, grams | 87 | 70 | 100 |
|   Bed Temperature, °F | 135 | 140 | 130 |
| Calculated Product Composition (pelletizer input basis), percent: |  |  |  |
|   74% Sodium Hydroxide | 80.3 | 49.8 | 54.5 |
|   Sodium Metasilicate, Anhydrous | 18.9 |  |  |
|   Soda Ash |  | 49.6 |  |
|   Sodium Sulfate |  |  | 45.0 |
|   Sodium Carboxymethylcellulose | 0.8 | 0.5 | 0.5 |
|  | 100.0 | 99.9 | 100.0 |
| Product Particle Size, inch | ¼-¾ | ¼-½ | ¼-½ |

1 Anhydrous Sodium Metasilicate Fines.
2 Soda Ash.
3 Sodium Sulfate.

EXAMPLE II

A product similar to Example I, Run 1, is produced by the method of Example I with the exception that a 45 percent by weight aqueous solution of potassium hydroxide is substituted for the 74% by weight aqueous solution of sodium hydroxide.

EXAMPLE III

A product similar to Example I, Run 1, is produced by the method of Example I with the exception that the solution consists of by weight 64 percent of a 74% by weight aqueous solution of sodium hydroxide, 10 percent by weight anhydrous sodium metasilicate fines, 25 percent by weight alkylaryl sulfonate wetting agent, and 1 percent by weight sodium carboxymethylcellulose.

EXAMPLE IV

A product similar to Example I, Run 1, is produced by the method of Example I with the exception that in lieu of the inclined pan the material is tumbled inside a 2-foot diameter rotating drum, 8 feet long, rotated at 3 r.p.m. by an electric motor through a conventional drive mechanism.

EXAMPLE V

In accordance with this example a seed bed of 4/14 mesh particles of sodium hydroxide is provided in an 11-inch diameter, 6½-inch deep inclined pan and pellets are continuously added during processing. The initial amount and the rate of addition during processing of the pellets are indicated in Table II below under the appropriate headings. The inclined pan employed is similar to that illustrated in FIGURE 5, p. 92 of Chemical Engineering for Feb. 5, 1962. The axis of the shaft on which the pan is mounted is tilted at an angle of 60° to the horizontal. The pan is rotated at 40 r.p.m. by means of a conventional electric motor and drive means driving the shaft.

A solution of a composition indicated in Table II below is preheated to 200° F. and poured onto the starting seed material during rotation at the addition rate indicated in Table II below. Heat is removed by normal circulation of atmospheric air. The temperature and relative humidity of the atmospheric air which is in contact with the material in the pan and the length of time for each agglomeration run are indicated in Table II below. The material in the pan is successfully agglomerated to produce ¼ inch to ½ inch rounded aggregates at a production rate of from 98 to 101 pounds per hour. The agglomerates discharged from the pan are sufficiently hard and free flowing to permit handling without sticking.

TABLE II

| | Run 1 | Run 2 | Run 3 |
|---|---|---|---|
| Operating variables, Length of Run, min | 8 | 13 | 8 |
| Seed: | | | |
| Initial amount, grams | 1,580 | 1,580 | 1,058 |
| Additional Rate, grams/min | 483 | 452 | 461 |
| Solution: | | | |
| Type (percent are by weight) | (1) | (1) | (2) |
| Additional Rate, grams/min | 245 | 307 | 228 |
| Inclined Pan Bed Temp., °F | (3) | (4) | (5) |
| Atmospheric Conditions, dry bulb, °F | 72 | 68 | 63 |
| Percent R.H | 55 | 54 | 50 |

1 74% NaOH in H₂O.
2 89% Caustic Liquor, 74% NaOH in H₂O; 10% Anhydrous Metasilicate Fines; 1% Sodium Carboxymethylcellulose; Total, 100%.
3 Stabilizes at 135.
4 Stabilizes at 142.
5 Stabilizes at 120.

It is to be understood that various changes and modifications may be made in the foregoing invention without departing from the spirit of the invention and scope of the appended claims.

What is claimed is:

1. A process for producing agglomerates comprising subjecting a mass of finely divided solid detergent particles to a tumbling action by a continuously moving surface, maintaining said mass of finely divided particles at a temperature of about 120 to 175° F., adding a liquid selected from the group consisting of molten alkali metal hydroxide and aqueous solution of alkali metal hydroxide onto said tumbling particles in an amount sufficient to produce agglomerates of about 10 to 100 percent by weight alkali metal hydroxide and continuing said tumbling to form said agglomerates.

2. The process of claim 1 wherein said mass of finely divided solid particles is a mass of particles of alkali metal hydroxide.

3. The process of claim 1 wherein said agglomerates comprise about 10 to 99 percent by weight alkali metal hydroxide and about 90 to 1 percent by weight of detergent material selected from the group consisting of alkaline, acid, and neutral builder salts, wetting agents, absorbent siliceous compounds, anti-soil redeposition agents, and mixtures thereof.

4. The process of claim 3 wherein said alkali metal hydroxide is sodium hydroxide.

5. The process of claim 3 wherein said alkali metal hydroxide is potassium hydroxide.

6. The process of claim 3 wherein said detergent materials are sodium silicate and carboxymethylcellulose.

7. The process of claim 3 wherein said detergent materials are soda ash and carboxymethylcellulose.

8. The process of claim 3 wherein said detergent materials are sodium sulfate and carboxymethylcellulose.

9. The process of claim 3 wherein said detergent materials are sodium silicate, carboxymethylcellulose and a wetting agent.

References Cited

UNITED STATES PATENTS

| 2,282,018 | 5/1942 | Baker | 252—135 |
| 2,515,880 | 7/1950 | MacMahon et al. | 252—135 |
| 3,007,877 | 11/1961 | Allen | 252—135 |
| 3,037,936 | 6/1962 | Tidridge et al. | 252—135 |
| 3,271,317 | 9/1966 | Otrahalek et al. | 252—135 |

FOREIGN PATENTS 790,160   2/1958   Great Britain.

LEON D. ROSDOL, *Primary Examiner.*

W. SCHULZ, *Assistant Examiner.*

U.S. Cl. X.R.

23—184, 313; 252—156